Oct. 26, 1954  G. D. TOOGOOD  2,692,477
TURBINE POWER PLANT UTILIZING CRUDE OIL
Filed May 11, 1948  3 Sheets-Sheet 1

GEORGE DUNCAN TOOGOOD
INVENTOR
By [signature]
HIS ATTORNEY.

Oct. 26, 1954     G. D. TOOGOOD     2,692,477
TURBINE POWER PLANT UTILIZING CRUDE OIL
Filed May 11, 1948     3 Sheets-Sheet 2
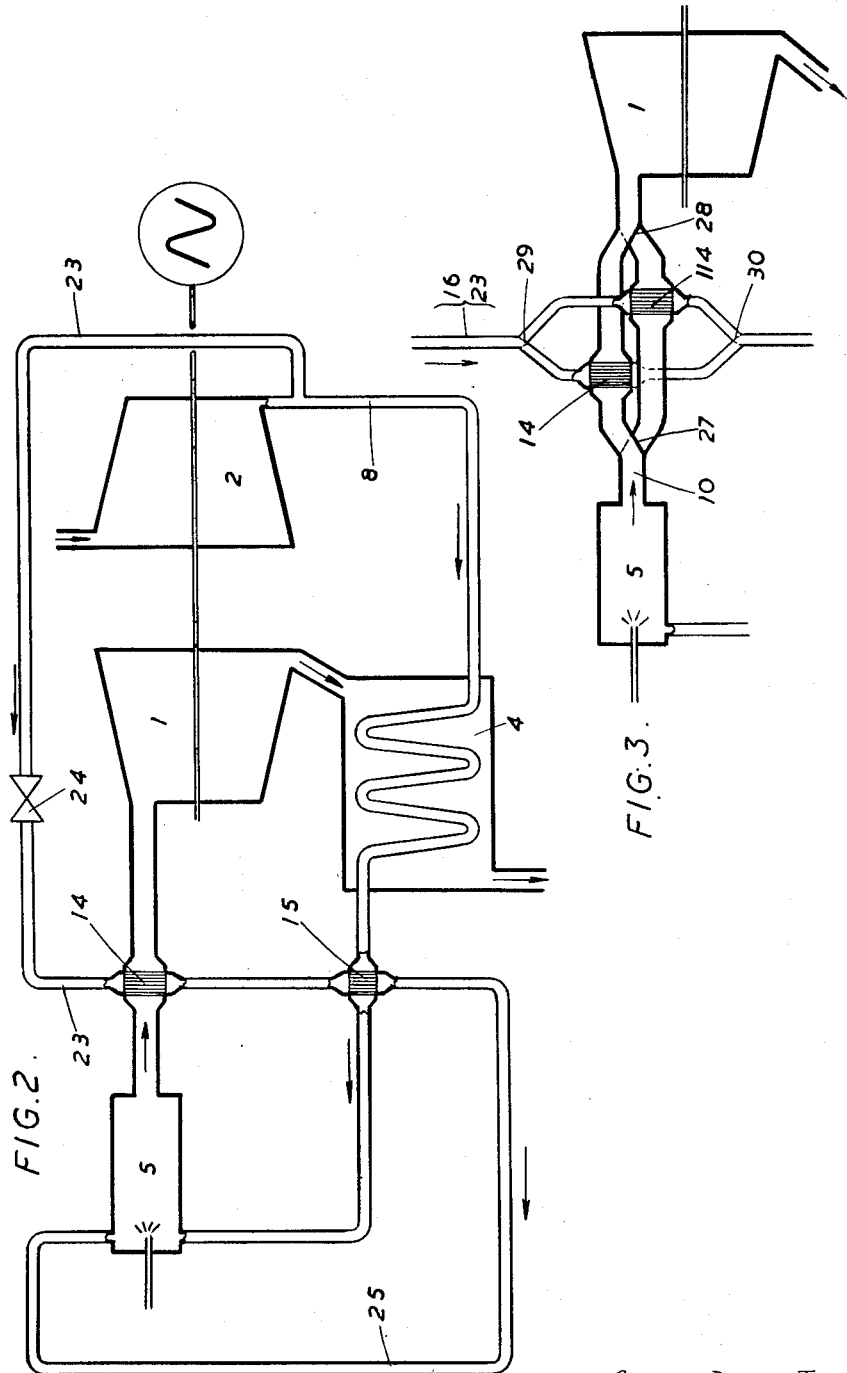
GEORGE DUNCAN TOOGOOD
INVENTOR
By Ernest H. Mechlin
HIS ATTORNEY.

Patented Oct. 26, 1954

2,692,477

UNITED STATES PATENT OFFICE 2,692,477

TURBINE POWER PLANT UTILIZING
CRUDE OIL

George Duncan Toogood, Chiseldon, England, assignor to Heat Exchangers Limited, London, England, a body corporate of Great Britain Application May 11, 1948, Serial No. 26,397

2 Claims. (Cl. 60—39.46)

This invention is concerned with improvements in or relating to gas turbine plants or installations.

Open cycle gas turbine plants comprise in addition to the combustion device or burner, the turbine proper and the air compressor, an air preheater. Usually the air preheater is a heat exchanger or recuperator of the kind in which the air to be preheated flows through one of its fluid paths on its way to the combustion device and the exhaust gases of combustion from the turbine flow through the other fluid path on their way to final discharge from the apparatus.

To obtain a high degree of efficiency in the recuperative air preheating heat exchanger of the plant or installation the respective fluid paths of the heat exchanger are so formed that the air and gases are divided into a number of small or thin streams, with the streams of the different fluids separated by relatively thin members of good heat conducting metal or alloy. If the efficiency of the air preheater is to be maintained, its gas-touched surfaces should be kept free from ash or other deposits liable to foul them which may be present in the gases from the burner.

In order to keep the running costs of gas turbine plants as low as possible, and also to reduce the fire hazard, it is desirable to use as fuel for the burner, crude, or only partially refined, oil. Notwithstanding the maintenance of a high temperature at the burner, perfect combustion of such fuel is seldom, or certainly not always, obtained, with the result that the combustion gases frequently carry matter liable to be deposited on the turbine blades and on the gas-swept surfaces of the air preheater. The gases may carry a certain quantity of unconsumed fuel in the form of carbon particles or bituminous matter, and also the incombustible ash and salts from the crude oil which owing to the high temperature are liquid but which due to the surfaces of the turbine and air preheater being relatively cool are liable to be rendered viscous or to solidify and, owing to the fall in the gas speed, to be deposited on said surfaces.

The high combustion temperature at the burner renders it necessary to ensure that the temperature of the gases entering the turbine is not unduly high and liable to set up excessive metal temperature in the turbine.

It has been proposed heretofore to pass the gases through a separator on their way from the burner to the turbine in order to remove dust from them. Also, it has been proposed to interpose a high temperature air heater between the burner and the turbine to moderate the gas temperature, a portion of the preheated air being fed to the burner and the remainder being further heated in said high temperature heater delivered into the first stage of the turbine, while the gases are delivered into the second stage.

It is the object of the present invention to provide, in a gas turbine plant, improved means adapted to remove from the gases of combustion, before they enter the turbine, viscous, liquid and other matter liable to foul the turbine and air preheater, while at the same time enabling the combustion temperature at the burner to be raised and the temperature of the gases entering the turbine to be controlled or moderated, without loss from the cycle of such heat as may be abstracted from the gases in moderating their temperature.

According to this invention, matter liable to foul or damage the turbine of a gas turbine plant is removed from the working medium by flowing the latter, after it leaves the combustion chamber and before it enters the turbine, over surfaces in one fluid path of a heat exchanger and flowing through the other fluid path of said heat exchanger a cooling medium whose operating condition is controlled to provide that the surfaces exposed to the working medium are at a controlled temperature at which sticky matter present in the working medium will adhere to said surfaces, solid particles entrained in the working medium depositing on and being retained by said sticky matter on said surfaces.

The surfaces of the heat exchanger over which the working medium flows are cooled to the temperature requisite to cause condensation of harmful gaseous constituents and bring the condensate so formed and harmful liquid matter to a sticky condition in which they will adhere to said cooled surfaces.

In order to prevent loss of the heat abstracted from the working medium during its passage through the heat exchanger the fluid medium employed to cool the heat exchanger, and to which fluid medium the said heat is transferred, is utilized in the plant cycle after flowing through said heat exchanger.

In carrying the invention into practice, the temperature of the surfaces of the heat exchanger over which the working medium flows in its passage through one fluid path of said heat exchanger, is controlled by varying at least one of the factors which determine the operative condition of the cooling medium flowing through the other fluid path of the heat exchanger, said factors being the temperature, pressure and speed of flow of said cooling medium.

The heat carrying fluid medium, after flowing through the aforesaid gas attemperating heat exchanger, may flow through one fluid path of a supplementary air heater through the other path of which air flows on its way to the burner.

Preferably the heat carrying fluid medium circulating through the aforesaid gas attemperating heat exchanger, and supplementary air heater if provided, will be air under pressure from the air compressor of the plant, and conveniently may constitute part of the air employed for combustion of fuel at the burner.

In the accompanying drawings:

Fig. 2 is an illustration similar to Fig. 1 of a plant according to another embodiment of the invention.

Fig. 3 is a fragmentary view showing diagrammatically a modification hereinafter described which may be made in the plants illustrated in Figs. 1 and 2.

Figure 1:
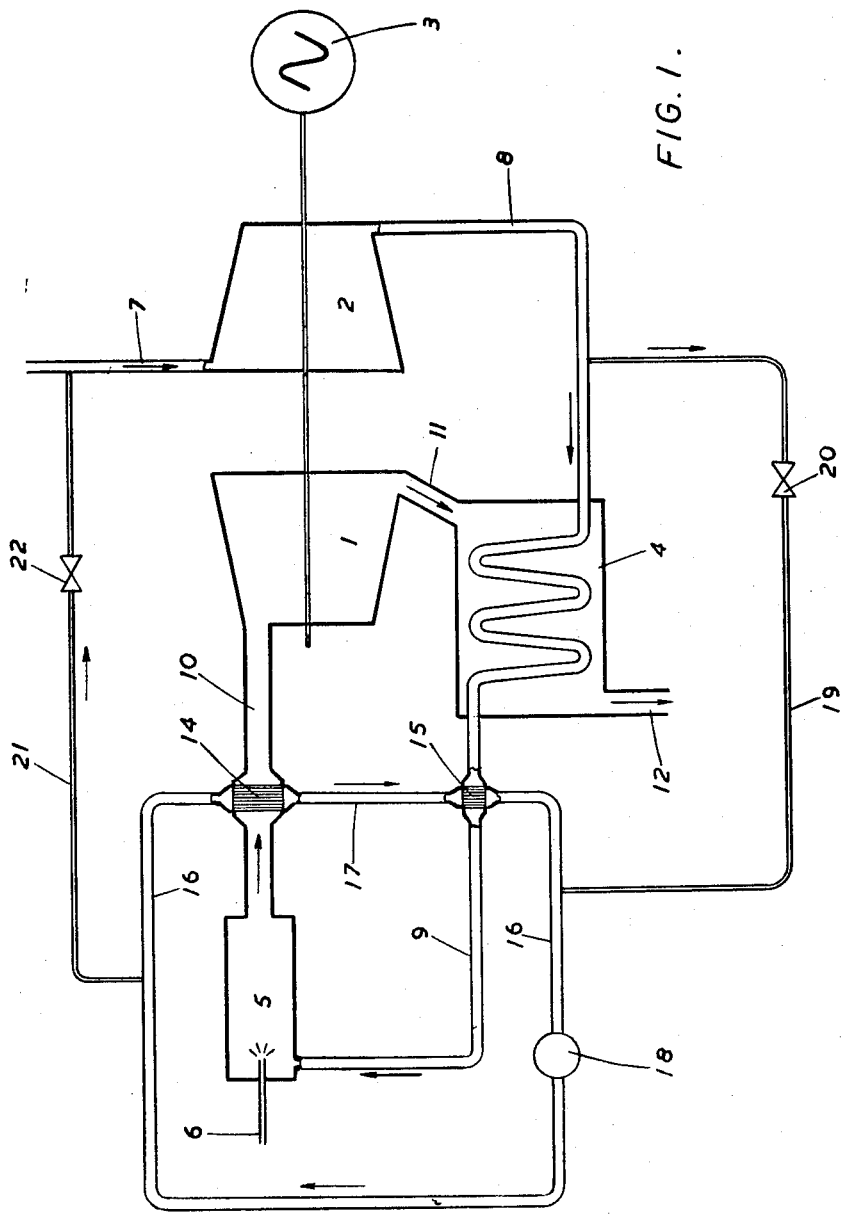
Fig. 1 shows diagrammatically a gas turbine plant according to one embodiment of the invention.

Referring to the drawings, the plant shown comprises a gas turbine 1 driving an air compressor 2 and a dynamo 3, an air preheater 4, and a burner or combustion device 5, 6 being the fuel supply pipe to the burner. Air enter the air compressor 2 by the intake 7 and is delivered by the pipe 8 to the air preheater 4 from which it flows by the pipe 9 to the burner 5, gases from which latter are delivered to the turbine 1 by the duct 10. From the turbine the gases flow by the duct 11 into the air preheater 4, leaving the latter by the duct 12.

According to the invention there is incorporated in the plant, in the gas passage 10 leading from the burner 5 to the turbine 1, a combined gas attemperating heat exchanger and gas purifier 14, and there may also be included in the plant a supplementary air heater 15. In the embodiment of the invention shown in Fig. 1 the combined heat exchanger and gas purifier 14 is constituted by a group or bundle of small diameter tubes disposed in the gas stream from the burner 5 transversely to the direction of flow of the gases. The supplementary air heater 15 is also constituted by a bundle of small diameter tubes disposed in the air stream flowing from the air preheater 4 by way of the duct 9 to the burner 5. Said heat exchanger 14 and the supplementary air heater 15 are arranged in a closed circuit, constituted by the ducts 16, 17, a rotary pump or blower 18 being provided for circulating in such circuit the air constituting the heat carrying fluid medium at a controlled speed. A pipe 19 controlled by a valve 20 is provided for bleeding air from the compressor 2 into the closed circuit, and a pipe 21 controlled by a valve 22, for bleeding air out of the circuit as may be necessary. By means of the pump 18 and the bleeding arrangements the circulating air can be maintained at the pressure and temperature requisite to maintain a predetermined metal temperature in the combined attemperating heat exchanger and gas purifier 14, and enable the tube bundle of the latter to be formed of lengths of mild steel tubing. Where convenient, the bleed-out pipe 21 is arranged to discharge into the intake of the air compressor.

If desired, means may be incorporated in the plant for cooling when necessary the air bled into the closed circuit.

In another embodiment of the invention illustrated in Fig. 2 the air circulated through the combined attemperating heat exchanger and gas purifier 14 and the supplementary air heater 15 may be provided by air tapped, by a pipe 23 controlled by a valve 24, from the stream delivered by the compressor 2, said air being taken off the pipe 8 at a point between the compressor and the air preheater 4. After flowing through said heat exchanger 14 and supplementary air heater 15, this air is introduced by the pipe 25 into the burner 5. If necessary, the air may be cooled before entering the heat exchanger 14. The attemperating heat exchanger 14, supplementary air heater 15 and air preheater 4 preferably will be constructed to provide that the pressure drop in the air flowing through the two former devices shall not exceed that of the air flowing through the preheater.

Figure 4:
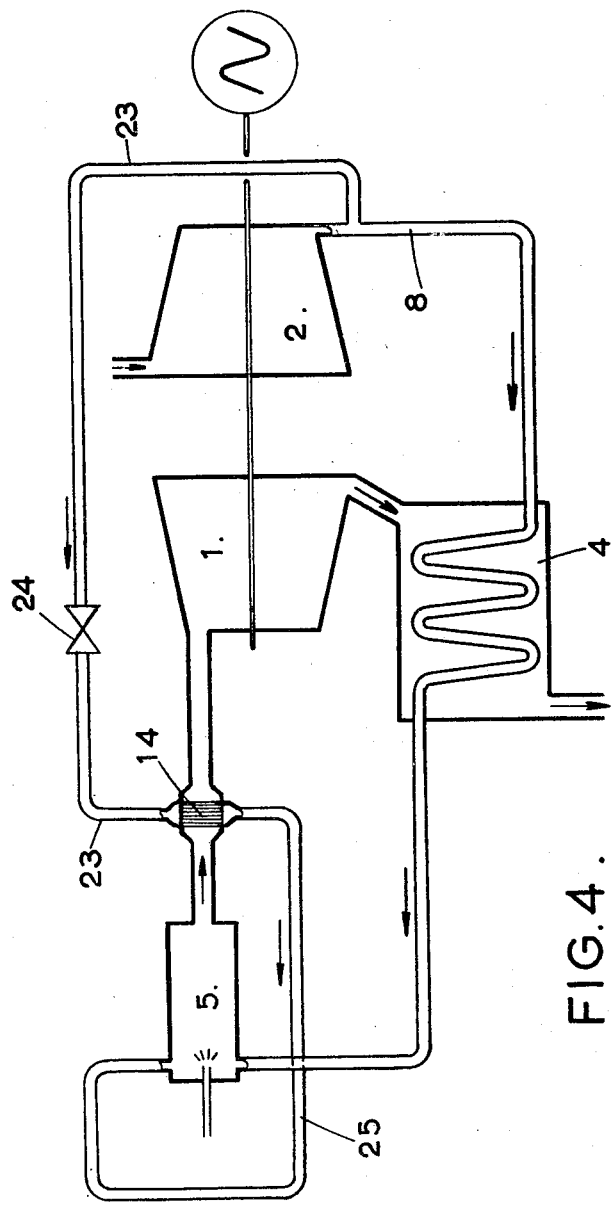
Figure 4 is an illustration similar to Figures 1 and 2 of a plant according to a further embodiment of the invention.

In some cases the supplementary air heater 15 may be omitted, and the air tapped by the pipe 23 from the compressed air main 8, after flowing through the attemperating heat exchanger 14, be delivered directly to the pipe 25 shown in Fig. 4.

As the deposits on the gas touched surfaces of the combined gas attemperating heat exchanger and gas purifier may be of such a nature that to remove them treatment with a special fluid is necessary, the tube bundle or other heat exchange unit preferably will be arranged to be readily removable from its housing so that it may be treated in a bath. In order to prevent shutting down the plant to effect the cleaning of said unit it is within the invention to bifurcate, as shown in Fig. 3, both the gas passage 10 from the burner 5 to the turbine 1 and the path 16 or 23 for the circulating heat carrying fluid medium, and to provide two heat exchange units each constituting an attemperating heat exchanger and gas purifier. One of said units or tube bundles 14 would be incorporated in one branch of the said gas passage 10 and in one branch of said fluid path 16 or 25 and the other unit 114 in the other branches of said passage and path, means such as dampers 27, 28 and 29, 30 being provided for directing the gas stream and circulating fluid medium through the appropriate respective branches so that one heat exchanger and gas purifier may be operative and the other available for cleaning, or removal and cleaning.

What I claim is:

1. A gas turbine plant comprising, in combination, a fuel burner for crude or partially refined oil, a turbine driven by a gaseous working medium consisting of gases of combustion, an air compressor supplying air under pressure to said burner, and to an air preheater heated by exhaust working medium from said turbine and interposed between said air compressor and said burner to heat the air supplied to the latter, a gas purifying and attemperating tubular heat exchanger interposed between said burner and said turbine with its tubes disposed across the fluid path through which the working medium flows, said medium flowing over the external surface of said tubes and cooling air from said air compressor flowing through them under pressure to cool said surface and cause harmful gaseous constituents and harmful liquid matter carried by the working medium to be rendered sticky and to adhere thereto and in order that solid matter carried by the said working medium will also adhere to said surface and utilising at the burners said cooling air heated in its passage through the exchanger.

2. A gas turbine plant as claimed in claim 1, including fuel injecting means injecting fuel to a burner, a duct connecting the delivery of the air compressor with the gas purifying and attemperating heat exchanger and providing a supply of cooling air under pressure through the tubes of said heat exchanger, and a duct connecting the latter to the burner to deliver the air heated in the said heat exchanger to said burner for supporting the combustion of fuel thereat.

References Cited in the file of this patent

UNITED STATES PATENTS

| Number | Name | Date |
|---|---|---|
| 730,782 | Morrison | June 9, 1903 |
| 2,298,663 | Traupel | Oct. 13, 1942 |
| 2,399,884 | Noack | May 7, 1946 |
| 2,461,186 | Seippel | Feb. 8, 1949 |
| 2,470,729 | Stalker | May 17, 1949 |
| 2,532,709 | Goddard | Dec. 5, 1950 |
| 2,608,055 | Welsh | Aug. 26, 1952 |

FOREIGN PATENTS

| Number | Country | Date |
|---|---|---|
| 125,057 | Switzerland | Apr. 2, 1928 |